United States Patent [19]

Sabre

[11] 4,395,076

[45] Jul. 26, 1983

[54] BEARING DESIGN FOR DRILL BIT

[76] Inventor: Daniel R. Sabre, 1520 Palethorp St., Philadelphia, Pa. 19122

[21] Appl. No.: 320,185

[22] Filed: Nov. 12, 1981

[51] Int. Cl.³ .......................................... F16C 19/00
[52] U.S. Cl. ...................................... 384/92; 175/371
[58] Field of Search ...................... 175/371, 372, 369; 308/8.2, 37, 101, 107, 172

[56] References Cited

U.S. PATENT DOCUMENTS

| 959,540 | 5/1910 | Hughes | 175/369 |
| 1,649,859 | 11/1927 | Reed | 175/369 |
| 1,932,489 | 10/1933 | Scott | 175/369 |

Primary Examiner—Stuart S. Levy
Assistant Examiner—Thomas R. Hannon
Attorney, Agent, or Firm—Harding, Earley & Follmer

[57] ABSTRACT

A bearing construction for a rotary earth boring drill bit is constructed of a bearing journal and a cutter rotatively mounted on the bearing journal, the bearing journal having a generally cone-shaped bearing wall formed by a plurality of steps comprised of a pair of adjacent walls joined at an apex having an acute included angle, and the cutter having a bearing wall formed with a plurality of steps mating in bearing contact with the steps of the bearing journal.

9 Claims, 5 Drawing Figures

BEARING DESIGN FOR DRILL BIT

BACKGROUND OF THE INVENTION

This invention relates generally to the art of earth boring and more particularly to a bearing construction for a rotary earth boring drill bit. The invention is particularly useful on a type of rotary drill bit known in the art as a tri-coned or duo-coned bit. It will be apparent, however, that the invention is applicable to other earth boring bits or the like.

In use, a tri-coned bit is connected at the lower end of a rotary drill string and, as the drill string is rotated, the bit disintegrates the earth formation by compressive failure to form a bore hole. A tri-coned bit includes three aprons that extend downwardly from the main body of the bit and have formed or supported thereon a bearing pin or journal. A cone cutter is mounted on each of the journals for rotation thereon. The cone cutters are provided with teeth or other cutting surfaces that disintegrate the formations as the bit is rotated.

Drill bits of the indicated type are subjected to severe operating conditions as a result of the environment in which they operate and the impact and other loads to which they are subjected during a drilling operation. Failure of the drill bit is costly in applications such as the drilling of bore holes for oil since the entire drill string must be removed to replace the failed drill bit. Since reasonable success has been achieved in improving the cutting structure of the cone cutter to extend its useful life, the result is that the bearings of the drill bits are generally the first part to fail during the drilling operations.

The primary reason for the failure of the prior art bearings is that as wear occurs the bearings become loose. Serious problems then result because (1) a loose bearing does not transfer forces accurately, (2) the teeth of the cutter rub back and forth and wear out without accomplishing compressive failure of the formation, and (3) the loose bearing permits intermittent torsional frequency which is often accompanied by a whiplash type of action.

SUMMARY OF THE INVENTION

It is the general object of the present invention to provide a bearing construction for a rotary earth boring drill bit which has a longer useful lifetime than the present-day bearings. To this end, the bearing construction of the invention provides a completely firm bearing which overcomes the problems of loose bearings.

Briefly stated, the rotary earth boring drill bit in accordance with the invention comprises a bit body having at least one apron having a bearing journal extending therefrom and a rotary cone cutter rotatively mounted on the bearing journal. The bearing journal has a generally cone-shaped bearing wall formed by a plurality of steps, each step having a pair of adjacent walls joined at an apex having an acute included angle. The cutter is also provided with a bearing wall cooperating with the bearing wall of the journal and formed with steps mating in bearing contact with the steps of the bearing journal.

DETAILED DESCRIPTION OF THE INVENTION

Figure 1:
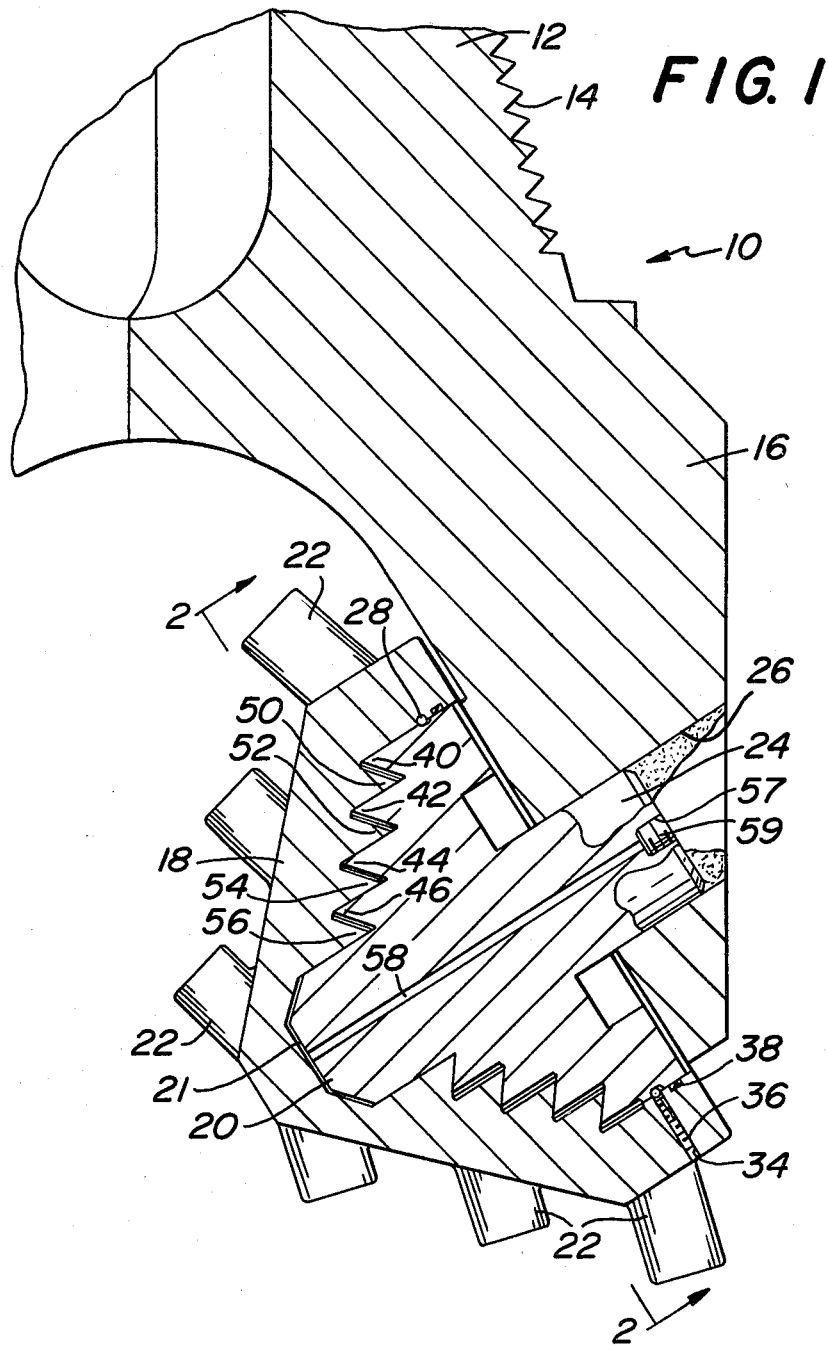
FIG. 1 is a sectional view showing a rotary cone cutter provided with the bearing construction in accordance with the invention.

Referring to the drawings, there is shown in FIG. 1 a tri-coned drill bit in accordance with the invention, the bit being indicated generally by the reference numeral 10. The bit 10 comprises bit body 12 having a threaded portion 14 being used to connect drill bit 10 to the lower end of a rotary drill string as is conventional in the art. Extending downwardly from bit body 12 are three substantially identical aprons or arms, only one apron 16 being shown in FIG. 1. At the lower end of each of the aprons there is provided an extended journal or bearing pin, the details of which will be discussed more fully hereafter. Three rotary cone cutters are rotatably mounted on the journals extending from the aprons, one cutter 18 associated with a journal 20 being shown in FIG. 1. Each of the cutters includes a plurality of teeth or other suitable cutting structure on its outer surface adapted to disintegrate earth formations as the drill bit 10 is rotated and moved downward in accordance with well-known earth boring procedures. The teeth 22 shown in FIG. 1 are typically in the form of tungsten carbide inserts mounted on the outer surface of the cone cutter 18, although various other structures may be used in accordance with techniques well-known in the art.

As is conventional, the drill bit 10 is provided with a central passageway extending along the central axis of body 12 for the flow of drilling fluid which enters from the upper section of the drill string immediately thereabove and flows downwardly through nozzles past the cone cutters 18. During drilling, the drill bit 10, which is connected to the lower member of the rotary drill string, is lowered into the well bore until the cone cutters 18 engage the bottom of the well bore whereupon the drill string is rotated causing drill bit 10 to rotate therewith. Drilling mud is forced downwardly through the interior passage of the drill string by mud pumps located at the surface, with the mud flowing through the central passageway of bit 10 and passing through nozzles past the cutting structure of the cutters to the bottom of the well bore. From the bottom of the well bore, the fluid flows upwardly in the annular passage between the rotary drill string and the wall of the well bore carrying with it the cuttings and debris from the drilling operation.

Journal 20 is fixedly mounted on apron 16 by means of a cylindrical stem 24 secured within a bore 26 in apron 16 by welding as shown in FIG. 1. Cutter 18 is rotatably supported on journal 20 at mating bearing surfaces as will be described more fully hereafter.

Means are provided for holding cutter 18 on journal 20 as the cutter rotates. The holding means comprises a plurality of ball bearings 28 received in raceways 29 and 30 extending circumferentially around mating cylindrical wall portions at the bases of cutter 18 and journal 20, respectively. By this arrangement, ball bearings 28 provide for rotatable engagement between cutter 18 and journal 20. During assembly, cutter 18 is positioned on journal 20 while ball bearings 28 are inserted between the raceways 29 and 30 through a bore 34 in cutter 18. After the ball bearings 28 are inserted, a plug 36 is inserted in bore 34 and welded in place.

Means are provided for sealing the end portions of the mating bearing surfaces between cutter 18 and journal 20 to prevent the loss of lubrication from between such bearing surfaces and to prevent contamination of the lubrication by materials in the well bore. To this end, a flexible ring-shaped seal 38 is received in a recess 39 in the bearing wall of cutter 18 outside of raceway 29. Seal 38 is constructed to provide sealing contact between opposed circumferentially extending portions of cutter 18 and journal 20. Seals of this type are well known in the art.

Journal 20 has a generally cone-shaped bearing wall formed by four steps 40, 42, 44, and 46, each of which comprises a pair of adjacent walls joined at an apex having and acute included angle of approximately forty-five degrees. More specifically, each of the steps 40-46 is comprised of a cylindrical wall and a conical wall concentric with the central axis of journal 20.

Cutter 18 has a generally cone-shaped internal bearing wall cooperating with the bearing wall of journal 20 and formed with four steps 50, 52, 54, and 56 providing walls mating in bearing contact with the walls of journal steps 40, 42, 44, and 46. To this end, each of these steps 50-56 is comprised of a cylindrical wall and a conical wall concentric with the central axis of journal 20 in the assembled position with cutter 18 mounted on journal 20 as shown in FIG. 1.

By reason of the above described step-like configuration of the bearing wall, a very firm bearing contact is provided so that cutter 18 rotates about journal 20 concentrically with respect to the journal central axis during a drilling operation. As shown in the drawings the cylindrical and conical walls of the steps are about the same width so as to evenly distribute the wear. The various features of this novel bearing construction will be described in more detail hereafter.

In accordance with conventional practice, a proper lubrication fluid will be located between the bearing walls of journal 20 and cutter 18. This lubrication fluid is introduced into this bearing region by way of a passage 58 extending axially through stem 24 from an inlet bore 57 to the inner end of journal 20 as is best shown in FIG. 1. The lubrication fluid is introduced into passage 58 under high pressure until the lubrication completely fills the small clearance space between bearing walls of cutter 18 and journal 20. The seal 38 prevents leakage of the lubrication fluid from the bearing region adjacent step 40 and contains such fluid within the bearing region. After completion of the filling operation, the grease fitting is removed and a plug 59 as shown is inserted in bore 57 at the inner end of passage 58 as shown in FIG. 1.

The bearing of the invention is designed to minimize the abrasive effect of debris that results from wear at the bearing wall region. To this end, there are provided a plurality of grooves or recesses which capture this debris promptly after it is formed to render it harmless. The grooves for journal steps 44 and 46 and cutter steps 52 and 54 are shown in FIG. 2 and will be described in detail, it being noted that similar recesses are provided in the bearing walls of the other steps.

Figure 2:
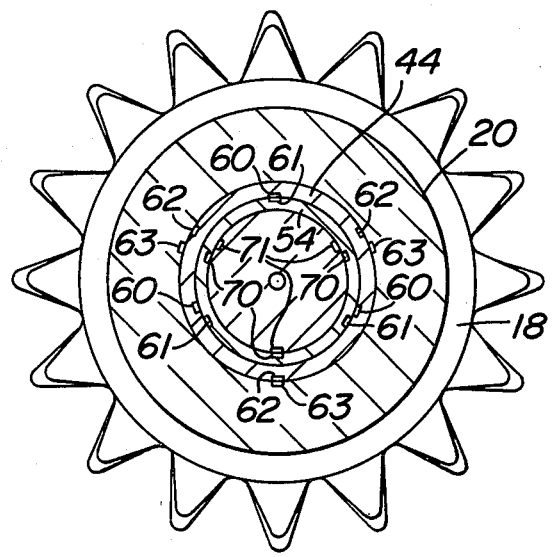
FIG. 2 is a sectional view taken on line 2—2 of FIG. 1.
Figure 3:
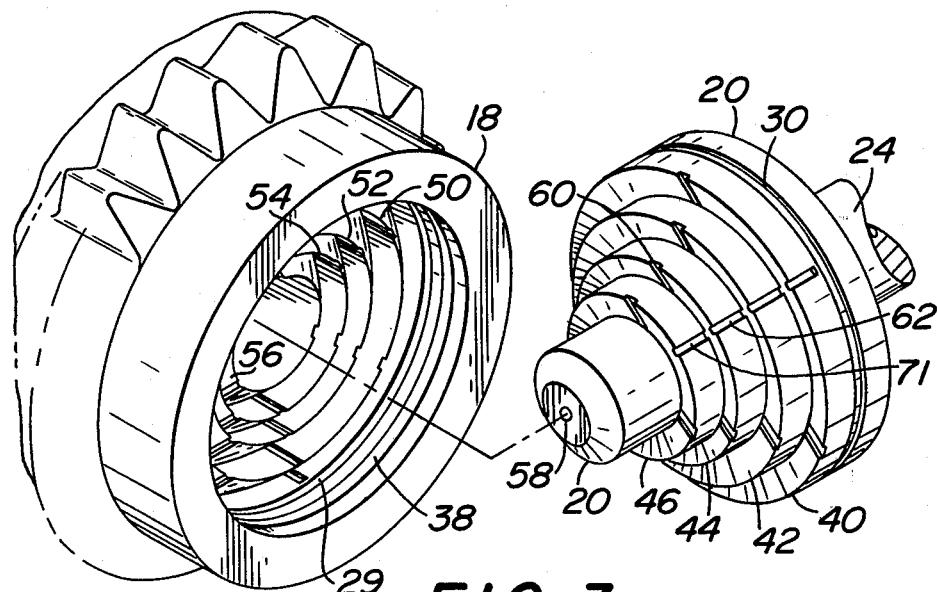
FIG. 3 is a perspective view showing a bearing journal and a cutter as shown in FIG. 1.
Figure 4:
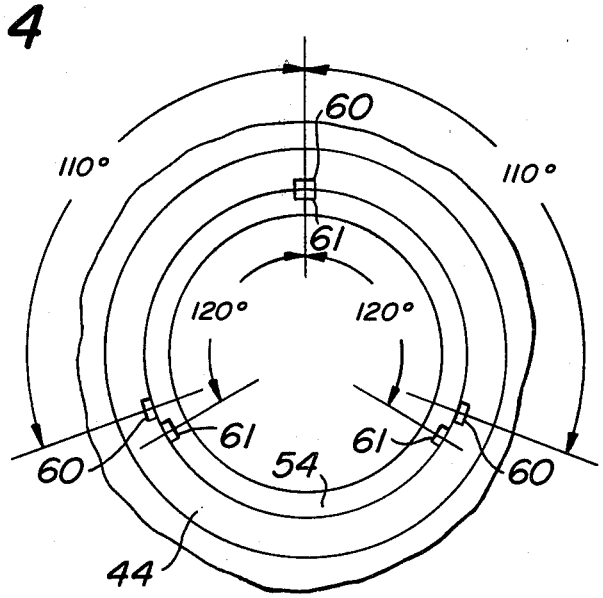
FIG. 4 is a diagrammatic view illustrating a detail of the invention.

Referring to FIG. 2, the conical wall of step 54 is provided with three axially extending grooves 61 spaced circumferentially 120° apart. The mating conical wall of step 44 is provided with axially extending grooves 60, two of which are spaced 110° apart from the third groove as is shown in FIG. 4. The different spacing of grooves 60 and 61 is such that only one pair of grooves 60 and 61 will be aligned at any one time as cutter 18 rotates about journal 20. This prevents the occurrence of hydrodynamic or hydrostatic fluid film surges of the lubrication fluid.

The cylindrical wall of step 44 is provided with three axially extending grooves 62 spaced circumferentially 120° apart while the mating cylindrical wall of step 52 has three axially extending grooves 63, two of which are spaced 110° apart from the third. Again, the spacing relation is such that only one pair of grooves 62 and 63 will be aligned at any one time in the rotation of cutter 18 about journal 20.

The cylindrical wall of step 54 is provided with three axially extending grooves 70, two of which are spaced 110° from the third, while the mating cylindrical wall of step 46 is provided with axially extending grooves 71 spaced circumferentially 120° apart. Again, this spacing relationship is such that only one pair of the grooves 70 and 71 will be aligned at any one time during rotation of cutter 18 about journal 20.

As was mentioned above, each of the journal steps 40-46 and each of the cutter steps 50-56 is provided with three circumferentially spaced grooves constructed and arranged in the same manner as those for the steps described in detail above. These grooves capture debris formed at the bearing wall region to render it harmless from causing any abrasive wear on the bearing walls.

The bearing design in accordance with the invention results in a bearing which has a longer useful life than prior art bearings and has many advantageous features. Firstly, the bearing design of the invention provides a very firm bearing which obviates many of the previously described problems causing failure of bearings as a result of wear producing a loose bearing. Also, the firm bearing of the invention prevents skewing of the bearing during use which can cause premature failure of the bearing.

Another feature of the bearing design is the very large bearing wall area provided. Obviously, the greater the surface of contact between the bearing walls, the greater the area over which the lubrication film can act to sustain a greater load without being squeezed out so that metal to metal contact can result in wear and eventual failure of the bearing. The use of a conical cutter design provides for a substantial bearing area. Moreover, the step-like bearing wall configuration adds to this bearing area to provide a very substantial load bearing surface of contact.

Another feature of the invention is that the firm bearing design and the large bearing area is distributed around the entire drill bit circumference during a loaded condition of operation. In the prior art bearings, when the drill bit is loaded on the bottom of a bore hole, the bottom or loaded side of the cutter tends to squeeze out lubrication in the clearance space and come into contact with the journal at this location with all of the clearance being on the unloaded or top side of the bearing. The step-like configuration of the bearing design of the invention insures that the cutter rotates concentrically even under heavy load conditions since the load is provided at both the top ("free") side and the bottom ("load") side. This action is apparent from a consideration of FIG. 1 from which it can be seen that as cutter 18 under a loaded condition would tend to move into contact with the mating bearing wall portions of journal 20, the step-like bearing wall portions at the upper part of cutter 18 will tend to move into contact with the mating bearing wall portions of journal 20 to thereby restrict the cutter movement. As stated above, this type of action is actually distributed throughout the entire circumference of the mating bearing wall portions of cutter 18 and journal 20.

Figure 5:
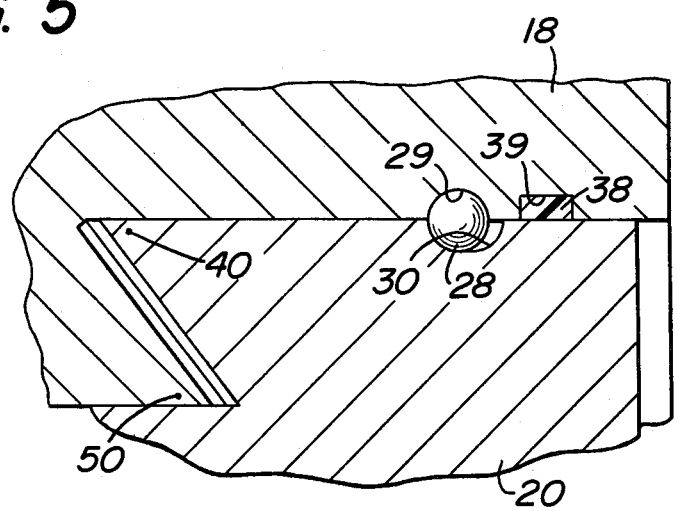
FIG. 5 is a fragmentary view of a detail of the bearing construction of the invention.

Another feature of the invention is that as the conical bearing wall portions wear, this wear does not result in any looseness of the bearing as is the case with the prior art bearings. The bearing design of the invention is such that a "closing in" effect results as the bearing wears whereby the bearing will wear "in" rather than wear "out". This action is apparent from consideration of FIG. 1, wherein it can be seen that as the conical bearing wall portions of cutter 18 wear, the cutter 18 will move closer to the journal 20 thereby maintaining the optimum lubrication clearance for which the bearing is designed. Accordingly, this design maintains an even thickness of the lubrication film to insure the proper clearance between the cutter and the journal, which action, of course, reduces wear. As shown in FIG. 5, raceway 30 is enlarged to accommodate the relative movement between journal 20 and cutter 18. Also, as shown in FIG. 1 a clearance space 21 is provided between the inner end of the cylindrical stem portion of journal 20 and cutter 18 to accommodate this relative movement.

By way of further explanation, it is noted that the mandatory lubrication film between the stationary journal and the rotating cutter is most effective when the two are fitted reasonably close and a proper lubrication clearance is provided. If the clearance becomes too large, the mating surfaces will brail because there is not enough hydraulic cushion provided by the lubrication to maintain them at the desired positions. The design of the invention producing the "closing in" effect overcomes this problem in the bearings in accordance with the invention.

It will be evident that the large diameter portion of the cutter 18 (at the upper tooth ring) is subjected to great stresses by reason of the large moments of torque which occur because this portion is supported at a maximum distance from the axis of the journal. A feature of the bearing design of the invention is that the bearing walls are located close to this high stress region so as to reduce the torque moment at this large diameter cutter portion and eliminate a source of bearing failure.

Another feature of the bearing design of the invention is that the cutter is provided with a generally even wall thickness throughout its conical portion. The even wall thickness design is a valuable asset when it comes to heat treating on the tooth portion of the cutter since there are no thin sections which inhibit the heat treating that may be utilized.

Another feature of the invention is the design involving the circumferentially spaced grooves which serve to capture debris and other dirt particles formed at the bearing wall region. By capturing these dirt particles promptly after they are formed, they are rendered essentially harmless from causing further abrasion of the bearing wall region.

I claim:

1. A rotary earth boring drill bit comprising
a bit body having at least one apron,
a bearing journal extending from said apron, and
a rotary cone cutter rotatively mounted on said bearing journal,
said bearing journal having a generally cone-shaped bearing wall formed by a plurality of steps extending along said bearing wall,
each of said steps comprising a pair of adjacent walls joined at an apex having an acute included angle,
said cutter having a bearing wall cooperating with said bearing wall of said bearing journal and formed with a plurality of steps mating in bearing contact with said steps of said bearing journal.

2. A drill bit according to claim 1 wherein said apex included angle of said steps is of a size such that wear will be evenly distributed throughout the bearing surfaces.

3. A drill bit according to claim 2 wherein said apex included angle is approximately forty-five degrees.

4. A drill bit according to claim 1 wherein each of said steps of said journal bearing wall is comprised of a cylindrical wall and a conical wall concentric with the central longitudinal axis of said bearing journal.

5. A drill bit according to claim 4 wherein each of said steps of said cutter is comprised of a cylindrical wall and a conical wall concentric with the central longitudinal axis of said bearing journal.

6. A drill bit according to claim 5 wherein said apex included angle of each of said steps is approximately forty-five degrees.

7. A drill bit according to claim 5 wherein said cylindrical and conical walls have about the same width.

8. A drill bit according to claim 1 including means for minimizing the abrasive effect of debris formed at the bearing wall region including a plurality of grooves spaced circumferentially around each of said walls forming said steps for capturing the debris promptly after it is formed to render it harmless.

9. A drill bit according to claim 7 wherein the spacing of said grooves is such that at any mating pair of walls no more than one pair of grooves will be aligned at any one time as said cutter rotates about said journal.

* * * * *